United States Patent
Schütz

(10) Patent No.: US 6,453,533 B1
(45) Date of Patent: Sep. 24, 2002

(54) METHOD FOR RECONDITIONING RETURNABLE BARRELS COMPRISED OF SHEET METAL

(75) Inventor: Udo Schütz, Selters (DE)

(73) Assignee: Schütz-Werke GmbH & Co. KG, Selters (DE)

( * ) Notice: Subject to any disclaimer, the term of this patent is extended or adjusted under 35 U.S.C. 154(b) by 53 days.

(21) Appl. No.: 09/638,093

(22) Filed: Aug. 11, 2000

(30) Foreign Application Priority Data

Aug. 14, 1999 (DE) .......................... 199 38 597

(51) Int. Cl.$^7$ .................. B21K 21/16; B23P 19/02; B67B 7/46
(52) U.S. Cl. .................. 29/401.1; 29/426.4; 30/400
(58) Field of Search .................. 29/401.1, 426.4; 30/400, 417

(56) References Cited

U.S. PATENT DOCUMENTS 4,483,456 A * 11/1984 Mays .......................... 220/67
5,802,725 A * 9/1998 Drifka et al. .................. 30/417

FOREIGN PATENT DOCUMENTS

| DE | 4126784 | 2/1993 |
| DE | 4437748 | 7/1996 |
| DE | 196 41 172 A1 | 4/1998 |

* cited by examiner

Primary Examiner—David P. Bryant
Assistant Examiner—John C. Hong
(74) Attorney, Agent, or Firm—Friedrich Kueffner

(57) ABSTRACT

In a method for reconditioning a returnable barrel of sheet metal, that is used initially as a bung barrel having a barrel wall and a top cover with a fill and discharge bung and fixedly connected to the barrel wall, and is to be reused as a lid barrel with a bung lid or bung-free lid connected to an outwardly rolled opening rim of the barrel wall via a clamping ring closure after removal of the top cover, wherein the barrel wall has an upper portion forming a barrel neck recessed or tapered relative to the outwardly rolled opening rim of the barrel wall, wherein the top cover of the initial bung barrel has a rolled outer rim placed on the outwardly rolled opening rim of the barrel wall and connected to the outwardly rolled opening rim by lock-seaming and welding, the top cover of the bung barrel is circularly cut concentrically to a longitudinal center axis of the barrel at a transition between a plate of the top cover and an upwardly extending inner rim of the top cover to separate the plate of the top cover from the barrel wall and leave a free lower portion of the upwardly extending inner rim. Subsequently, the lower portion of the upwardly extending inner rim is formed into an annular circumferential inner groove of the barrel neck.

1 Claim, 4 Drawing Sheets

METHOD FOR RECONDITIONING RETURNABLE BARRELS COMPRISED OF SHEET METAL

BACKGROUND OF THE INVENTION

1. Field of the Invention

The invention relates to a method for reconditioning returnable barrels of sheet metal, which are embodied as bung barrels for their initial use and comprise a top cover, fixedly connected to the barrel wall and having a fill and discharge bung. For their further use, the bung barrels can be reconditioned to lid barrels by cutting out the top cover and providing bung lids or bung-free lids in its place, which lids are connected by a clamping ring closure to the outwardly rolled opening rim of the barrel wall. The upper portion of the barrel wall of the bung barrels forming the barrel neck is recessed or tapers relative to the opening rim of the barrel wall and, when manufacturing the bung barrel, the top cover with its rolled outer rim is placed onto the opening rim of the barrel wall and is connected thereto by lock-seaming and welding.

2. Description of the Related Art

The stringent environmental protection regulations require a transition from single use packagings to returnable packagings, such as, for example, barrels of steel or plastic, the conversion to packagings with greater volume with the goal of reducing the residual amounts, and the development of new returnable containers which, with respect to protecting the environment from harmful substances, can be reconditioned and can be optimally emptied with respect to residual amounts as well as easily cleaned for the reconditioning process as well as for a proper disposal by a pollutant-free destruction, for example, by combustion, or for recycling of the manufacturing material.

The development of reconditionable returnable barrels of sheet steel resulted in the reconditioning method described in DE 196 41 172 A1 with which bung barrels, after the first transport or the first storage of liquid material, classified as a great hazard posing a threat to the environment, and after discharge of the dangerous liquid material, can be reconditioned to lid barrels for further use as transport and storage barrels for granular and powder-like as well as paste-like materials, classified as a low hazard, with relatively minimal expenditure. Such lid barrels facilitate the filling as well as the discharge of the contents and provide the possibility of a direct action on the container contents, for example, by means of a simple stirring device, in contrast to bung barrels with a top cover which is connected by lock-seaming to the barrel wall, in which case the contents of the barrel can only be stirred by means of a complex stirring device, for example, configured as a folding propeller, that is to be introduced through the fill and discharge bung of the barrel.

The lid barrels which are reconditioned according to the method of DE 196 41 172 A1 from bung barrels cannot be used for transport and storage of liquids because the closure lid does not comply with the tightness requirements under external force impact, especially in drop tests. Moreover, when cutting off the top cover from the body of the bung barrel by a separating cut performed perpendicularly to the longitudinal center axis at the level or in the area of the center point of the rolled opening rim of the barrel wall, there is the risk that the rolled barrel rim will be damaged.

SUMMARY OF THE INVENTION

It is an object of the present invention to provide a cost-efficient method for-reconditioning bung barrels of sheet metal to lid barrels which can be used for the transport and storage of liquids as well as powder-like and granular as well as paste-like materials.

In accordance with the present invention, this is achieved in that, during reconditioning of the bung barrels to lid barrels, a circular cut is performed concentrically to the longitudinal center axis of the barrel through the transition area between the plate of the top cover and the inner rim of the top cover for separating the plate of the top cover from the barrel wall and in that the lower portion of the inner rim of the top cover is formed to an annular circumferential inner groove of the barrel neck.

By performing, in accordance with the reconditioning method of the present invention, a circular cut concentrically to the longitudinal center axis of the barrel through the transition area between the plate of the top cover and the inner rim of the top cover, the top cover of a bung barrel comprised of sheet metal can be separated from the barrel wall without damaging the outwardly rolled upper rim of the barrel wall. By forming the lower portion of the inner rim of the top cover, which is exposed after separating the plate from the top cover, into an annular circumferential inner groove of the barrel neck, the barrel neck is reinforced such that the barrel lid complies with the tightness or sealing requirements for drop tests so that the reconditioned lid barrel can be used for liquids. Furthermore, the risk of injury caused by the sharp edges of the inner rim of the top cover that remain after cutting is excluded.

DESCRIPTION OF THE PREFERRED EMBODIMENTS

Figure 1:
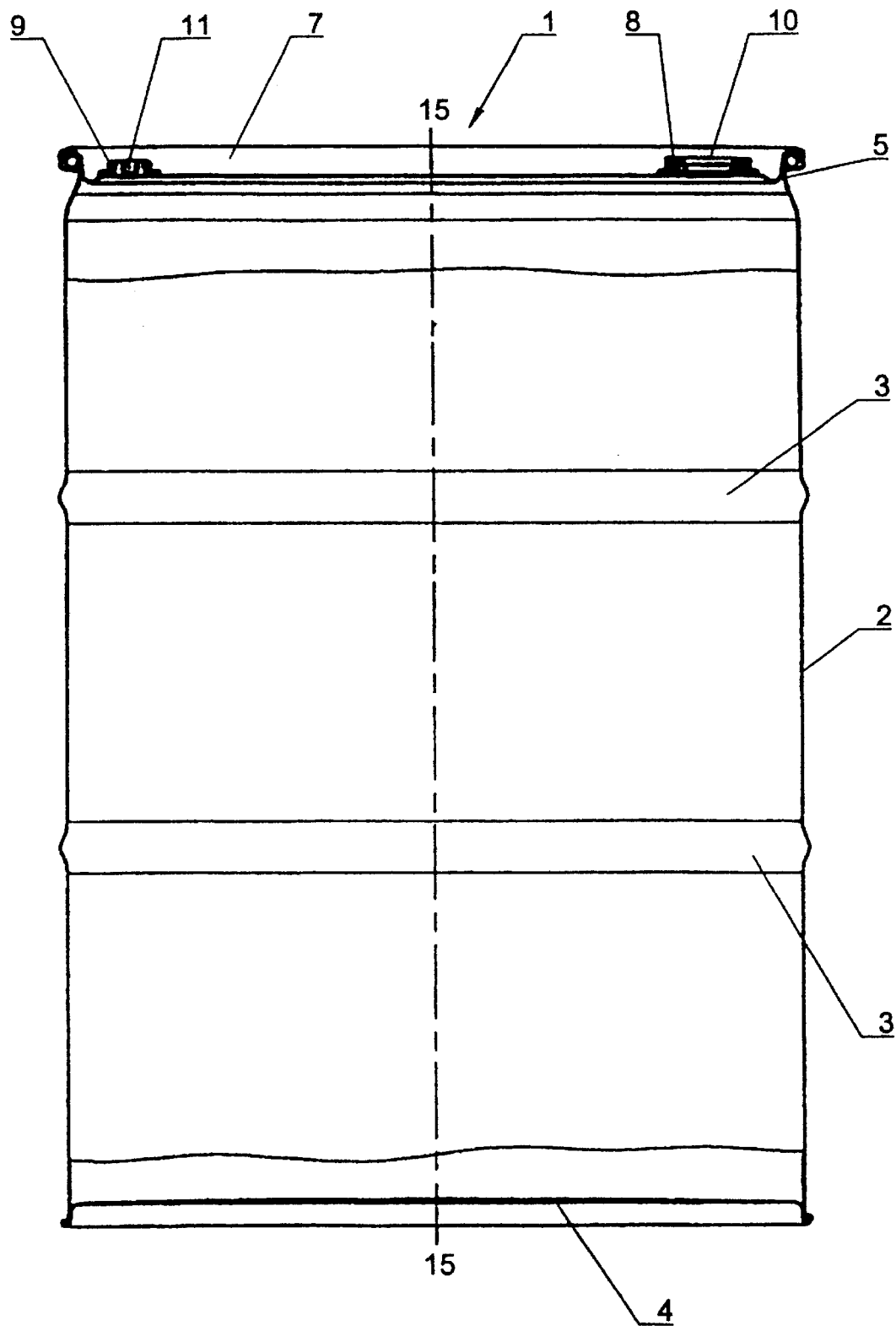
FIG. 1 is a longitudinal section of a returnable barrel configured as a bung barrel.
Figure 2:
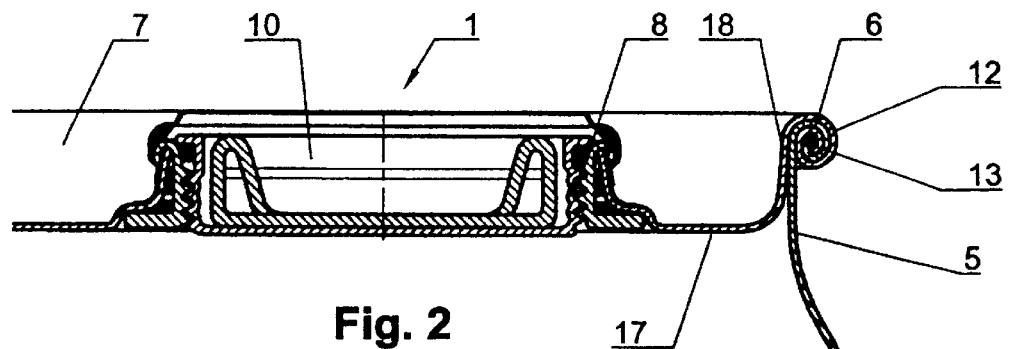
FIG. 2 shows a detail of the top cover of the bung barrel of FIG. 1.
Figure 3A:
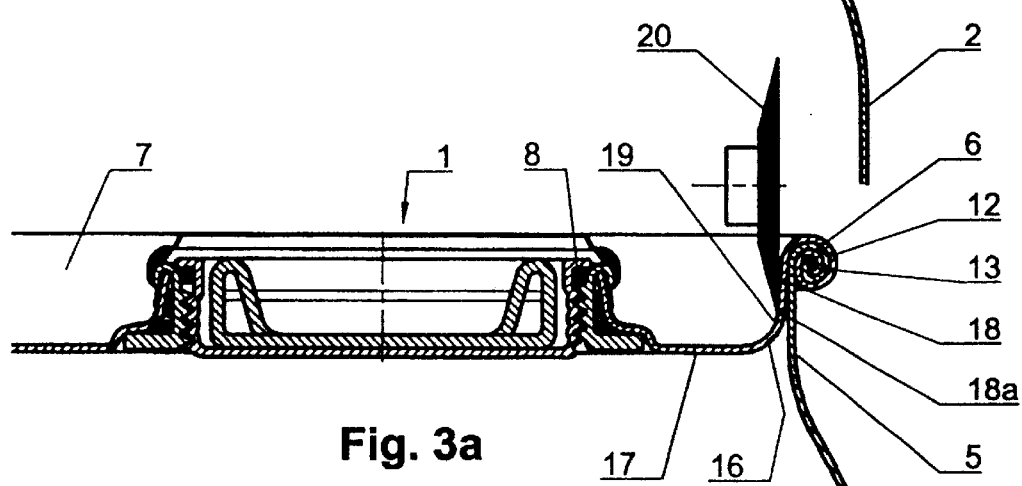
FIGS. 3a and 3b show in a detail view, respectively, the separation of the top cover from the barrel wall of the bung barrel by means of a cutting wheel.
Figure 3B:
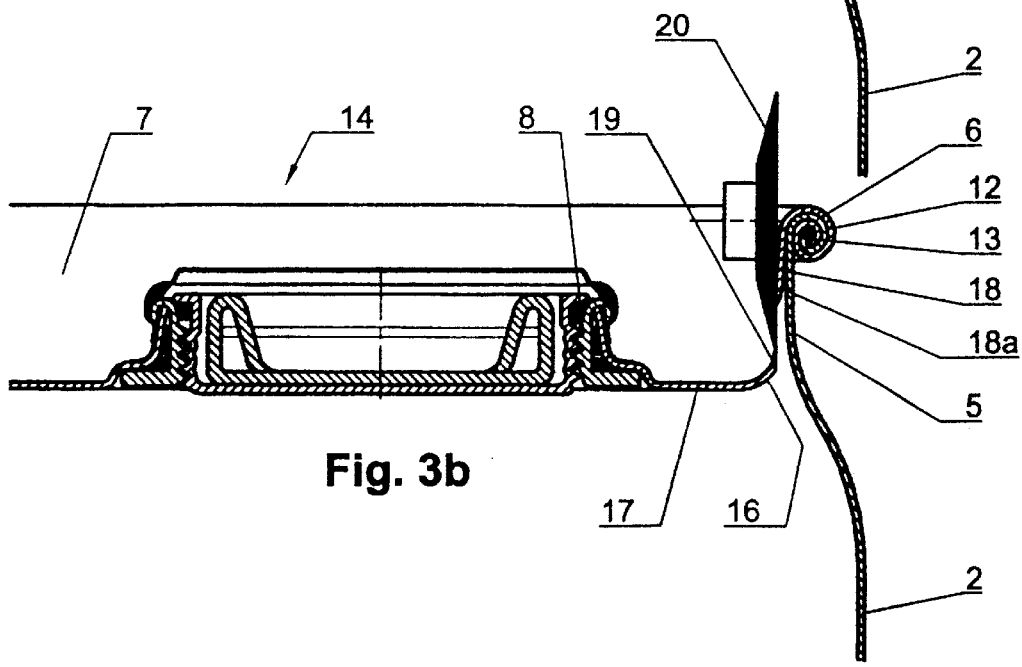

The bung barrel 1 illustrated in FIGS. 1 and 2 is comprised of sheet steel and has a cylindrical barrel wall 2 with rolling and stiffening channels 3 which is closed seal-tight by a base 4 connected by lock-seaming. The upper portion of the barrel wall 2 forming the barrel neck 5 is recessed relative to the opening rim 6 of the barrel wall 2 which is formed as an outwardly rolled rim.

The top cover 7 of the bung barrel 1 comprises a fill and discharge bung 8 as well as a venting bung 9 which can be closed by bung stoppers 10, 11 embodied as screw stoppers. The top cover 7 is placed with its rolled outer rim 12 onto the opening rim 6 of the barrel wall 2 and is connected thereto by lock-seaming and welding. The top cover 7 is additionally sealed relative to the barrel wall 2 by a sealing material 13 positioned between the two rims 6 and 12.

Figure 4:
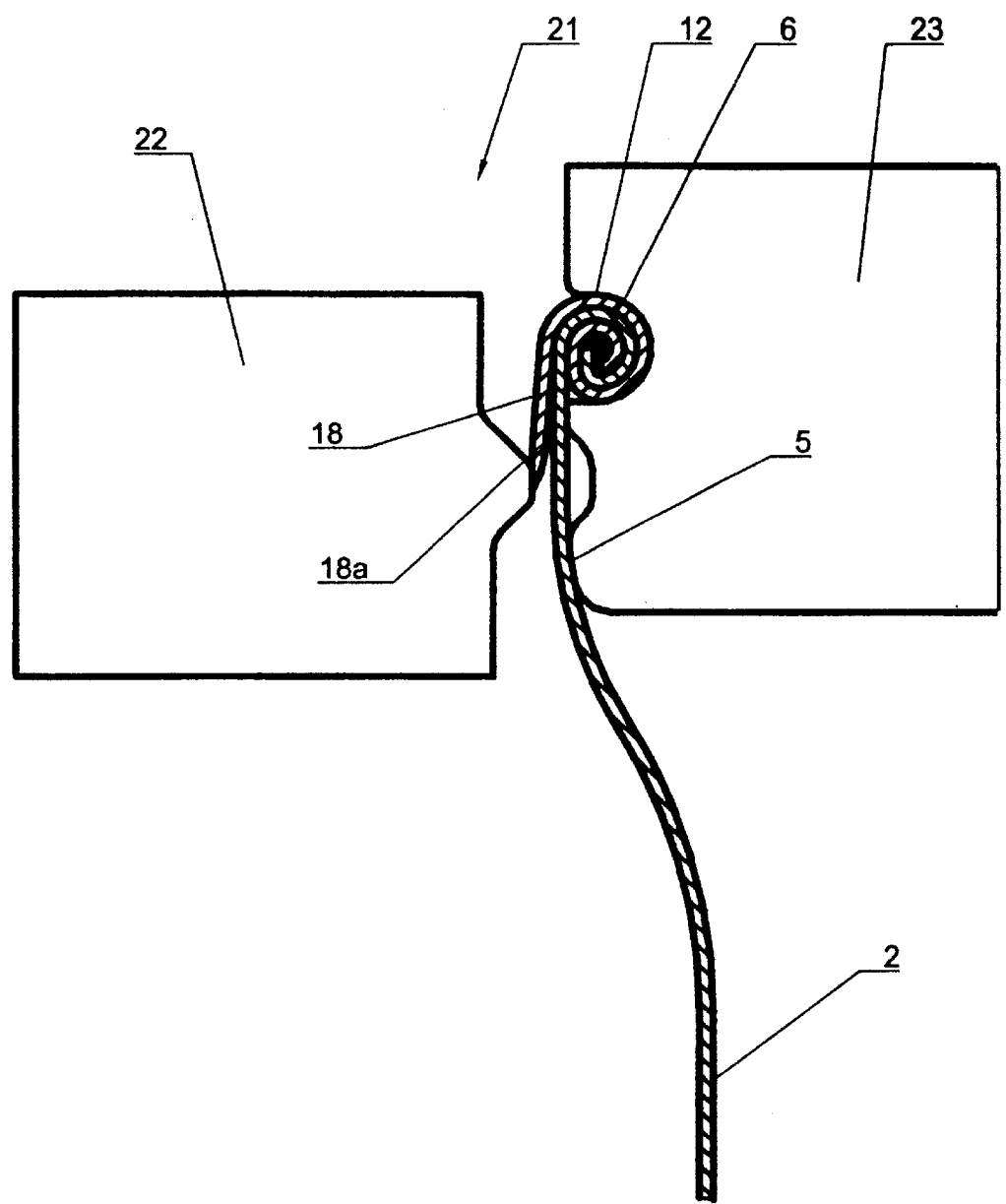
FIG. 4 shows the tool for forming the inner groove of the barrel neck of the reconditioned lid barrel.
Figure 5:
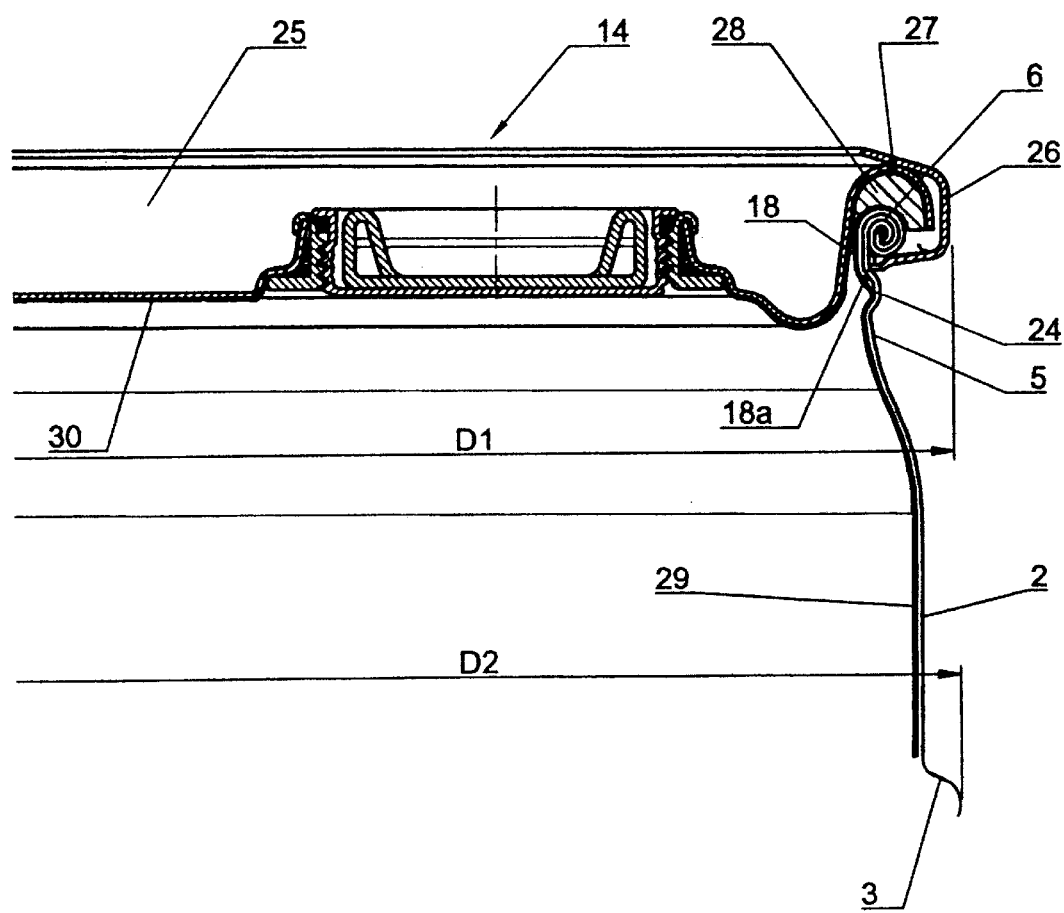
FIG. 5 illustrates the lid area of the lid barrel reconditioned from the bung barrel.

When reconditioning the bung barrel 1, as illustrated in FIGS. 1 and 2, to a lid barrel 14, as shown in FIG. 5, the plate 17 of the top cover 7 is separated from the barrel wall 2 by a circular cut performed concentrically to the longitudinal center axis 15—15 of the barrel 1 through the transition area 16 between the plate 17 of the top cover 7 and the inner rim 18 of the top cover 7 by means of a cutter wheel 20, and, subsequently, the lower portion 18a of the inner rim 18 of the top cover 7 is formed by means of a forming tool 21 according to FIG. 4, which comprises two forming rollers 22, 23, into an annular circumferential inner groove 24 of the barrel neck 5.

The lid barrel 14 according to FIG. 5 is closed by a bung lid 25 or a simple (bung-free) lid. The lids are secured by means of a clamping ring 26, with interposition of a seal 28 placed into the lid rim 27, onto the opening rim 6 of the barrel neck 5.

The lid barrel 14 can be furnished with an exchangeable inner envelope 29, also referred to as an inner liner, comprised of plastic foil which is pulled across the opening rim 6 of the barrel wall 2 and clamped between the opening rim 6 and the lid seal 28.

Moreover, the bung lid 25 of the lid barrel 14 can be provided with an inner coating 30 of a plastic foil or a metal-plastic composite foil.

In the context of placing the bung barrels 1 and the lid barrels 14 into a container according to ISO standards, with respect to the most common barrel configuration with a volume of 213 liters according to DIN 6643 standard, the barrel neck 5 is recessed relative to the opening rim 6 of the barrel wall 2 such that the outer diameter D1 of the clamping ring 26, including its lever closure, is identical to or smaller than the diameter D2 of 585 mm of the rolling and stiffening channels 3 of the barrel wall 2.

While specific embodiments of the invention have been shown and described in detail to illustrate the inventive principles, it will be understood that the invention may be embodied otherwise without departing from such principles.

What is claimed is:

1. A method for reconditioning a returnable barrel comprised of sheet metal, wherein the returnable barrel is configured to be used initially as a bung barrel, comprising a barrel wall and a top cover with a fill and discharge bung and fixedly connected to the barrel wall, and is configured to be reused as a lid barrel with a bung lid or bung-free lid connected to an outwardly rolled opening rim of the barrel wall via a clamping ring closure after removal of the top cover, wherein the barrel wall has an upper portion forming a barrel neck recessed or tapered relative to the outwardly rolled opening rim of the barrel wall, wherein the top cover of the initial bung barrel is configured to have a rolled outer rim placed on the outwardly rolled opening rim of the barrel wall and connected to the outwardly rolled opening rim by lock-seaming and welding, the method comprising the steps of:

circularly cutting the top cover of the bung barrel concentrically to a longitudinal center axis of the barrel at a transition between a plate of the top cover and an upwardly extending inner rim of the top cover to separate the plate of the top cover from the barrel wall and leave a free lower portion of the upwardly extending inner rim; and forming the lower portion of the upwardly extending inner rim into an annular circumferential inner groove of the barrel neck.

* * * * *